(12) United States Patent
Takahashi

(10) Patent No.: US 6,504,960 B2
(45) Date of Patent: *Jan. 7, 2003

(54) IMAGE PROCESSING APPARATUS AND METHOD AND MEMORY MEDIUM

(75) Inventor: Kenji Takahashi, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,326

(22) Filed: Oct. 19, 1998

(65) Prior Publication Data
US 2002/0006235 A1 Jan. 17, 2002

(30) Foreign Application Priority Data
Oct. 21, 1997 (JP) ............................. 9-288563

(51) Int. Cl.[7] ................................. G06K 9/54
(52) U.S. Cl. ..................................... 382/305
(58) Field of Search ........................ 382/305, 216, 382/217, 286, 294, 295, 296; 396/29, 48, 80; 348/175–177, 333, 220, 207; 347/214, 217; 358/449, 1.18; 345/723; 355/18, 40

(56) References Cited
U.S. PATENT DOCUMENTS

| 5,608,542 A | * | 3/1997 | Krahe et al. | 358/487 |
|---|---|---|---|---|
| 5,739,924 A | * | 4/1998 | Sano | 358/487 |
| 5,787,313 A | * | 7/1998 | Compton et al. | 396/80 |
| 5,815,205 A | * | 9/1998 | Hashimoto et al. | 348/373 |
| 5,894,326 A | * | 4/1999 | McIntyre et al. | 348/333 |
| 5,974,401 A | * | 10/1999 | Enomoto et al. | 705/40 |
| 5,982,999 A | * | 11/1999 | Aoyagi et al. | 395/117 |
| 5,985,528 A | * | 11/1999 | Komamura et al. | 430/398 |
| 5,995,770 A | * | 11/1999 | Rochford et al. | 396/311 |
| 6,040,849 A | * | 3/2000 | McIntyre et al. | 347/214 |
| 6,111,605 A | * | 8/2000 | Suzuki | 348/220 |
| 2001/0035875 A1 | * | 11/2001 | Suzuki et al. | 345/723 |

* cited by examiner

Primary Examiner—Jose L. Couso
Assistant Examiner—Kanji Patel
(74) Attorney, Agent, or Firm—Fitzpatrick, Cella, Harper & Scinto

(57) ABSTRACT

The invention intends to enable unified management of the image data taken with the digital camera and the corresponding print format separately set for the printing device. For this purpose there is disclosed an image processing apparatus comprising an image taking unit for outputting image data by taking the image of an object, a memory medium capable of storing a plurality of print formats to be set in a predetermined print apparatus, together with the image data outputted from said image taking unit, and a communication unit for communicating with an external output apparatus thereby transferring the image data and the print formats stored in the memory medium to the external output apparatus.

29 Claims, 6 Drawing Sheets

PRINT DATA FILE 71

| SHEET NO. | FILE NAME | VER/HOR | LAYOUT | PRINT POSITION | PRINT NO. | PRINT SIZE |
|---|---|---|---|---|---|---|
| 1 | AUT_0001.JPG | VER | 1 | 1 | 1 | 160mm |
| 2 | AUT_0001.JPG | VER | 2 | 1 | 1 | 120mm |
| 2 | AUT_0002.JPG | HOR | 2 | 2 | 1 | 160mm |
| 3 | AUT_0002.JPG | HOR | 3 | 1 | 1 | 120mm |
| 3 | AUT_0003.JPG | HOR | 3 | 2 | 1 | 120mm |
| 3 | AUT_0004.JPG | HOR | 3 | 3 | 1 | 120mm |

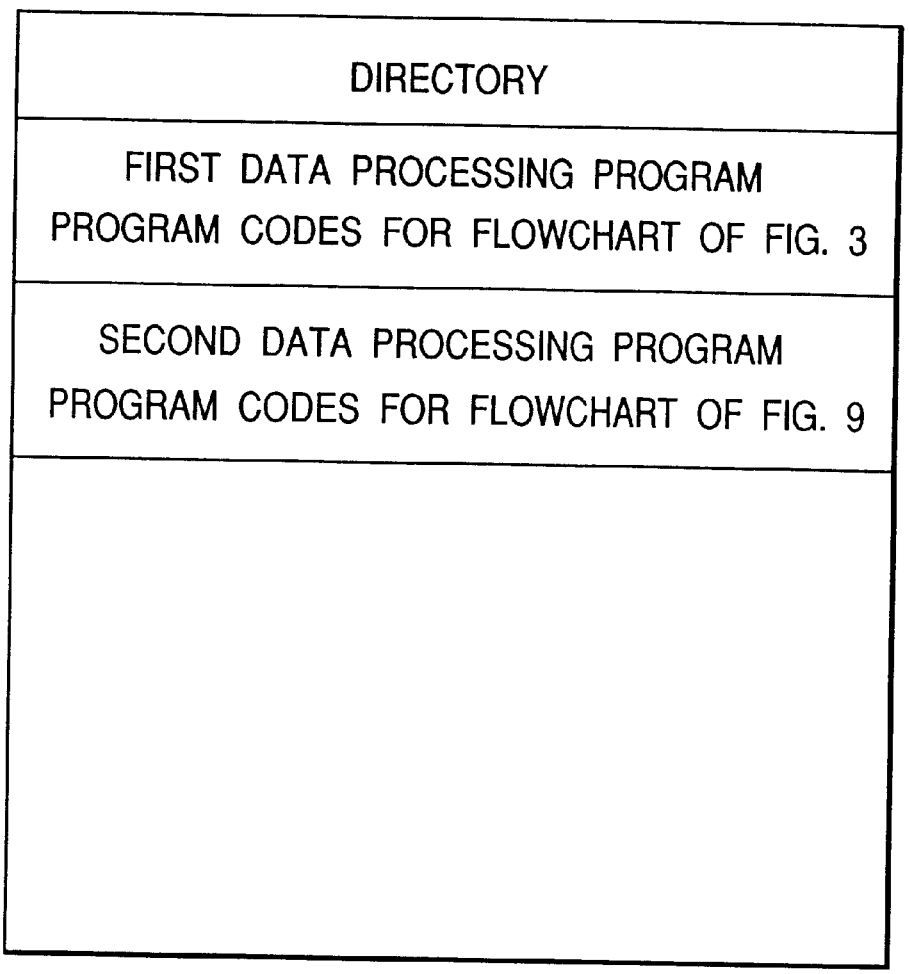

IMAGE PROCESSING APPARATUS AND METHOD AND MEMORY MEDIUM

BACKGROUND OF THE INVENTION

1. Field of the Invention

The present invention relates to an image processing system, a digital camera and an image memory apparatus for storing image data taken with the digital camera and a print data file of such image data and effecting image processing by analyzing such print data file, a data processing method for the image processing system, and a memory medium storing a computer readable program for such system.

2. Related Background Art

The image format processed in such conventional image processing system only contains the image size, resolution information and image preparation date of the image data, and, in case of printing the image data of the digital camera through a personal computer, the user is required to effect the printing by confirming the image on an application and setting the resolution, layout and number of prints.

On the other hand, with the spreading of digital cameras, there are increasing so-called digital laboratories which provide image output service on the received image data, in order to enable the use of digital camera by the non-users of personal computers.

In the print service of the conventional silver halide-based photography system, it has been necessary to develop all the images within a film and to print all the images for the purpose of confirmation. On the other hand, in the digital camera, it is possible to confirm the image immediately after image taking, so that it is possible to only print the necessary images.

However the image data selected by the user have to be managed by the user himself, and the image number to be printed, output size, number of outputs and layout information have to be recorded or memorized and instructed to the digital laboratory.

SUMMARY OF THE INVENTION

The present invention is intended to solve the drawbacks mentioned in the foregoing, and the object thereof is to provide an image memory apparatus, a digital camera and an image processing system capable, in storing image data in a memory medium, of managing a print format for the image data by storage in the same memory medium, and, in reading the image data managed by the memory medium, executing a predetermined image processing on the taken image data for the print process according to the print format, thus to enable unified management on the image data and the print format corresponding thereto which have been independently managed, thereby alleviating the burden of print format setting for the taken and stored image data, freely allowing variation or correction of the content of the set print format and easily and securely obtaining the print result intended by the user from the image output device, and a data processing method and a memory medium, storing a computer readable program, for use in such image processing system.

In a first aspect in the present invention, there is provided a memory medium capable of storing a plurality of print formats to be set in a predetermined printing device, together with input image data.

In a second aspect in the present invention, the area for storing the print format is secured within each image data storage area in the memory medium.

In a third aspect in the present invention, the area for storing the print format is secured outside each image data storage area in the memory medium.

In a fourth aspect in the present invention, the print format includes vertical/horizontal information of the taken image data, image output size information, image output number information and layout information.

In a fifth aspect in the present invention, there are provided an image taking unit for outputting image data by taking the image of an object, a memory medium capable of storing a plurality of print formats to be set in a predetermined print device together with the image data outputted from the image taking unit, and communication means capable of communicating with an external output apparatus thereby transferring the image data and the print formats stored in the memory medium to the external output apparatus.

In a sixth aspect in the present invention, the area storing the print formats is secured in each image data storage area in the memory medium.

In a seventh aspect in the present invention, the area storing the print formats is secured in an area different from the image data storage area in the memory medium.

In an eighth aspect in the present invention, there are provided display means for displaying the taken image data, first designation means for designating a confirmation mode for confirming the print format stored in the memory medium, and control means for causing the display means to display the stored print formats when the confirmation mode is designated by the first designation means.

In a ninth aspect in the present invention, there are provided second designation means for designating a format mode for setting the print format for each image data stored in the memory medium, and format setting means for setting, in the memory medium, a desired print format entered for each image data when the format mode is designated by the second designation means.

In a tenth aspect in the present invention, there is provided detection means for detecting whether a camera unit is in a vertical state or in a horizontal state in the image taking state, and the format setting means is adapted to automatically set the vertical/horizontal information of the taken image data in the print format in the memory medium, based on the positional state detected by the detection means.

In an eleventh aspect in the present invention, there are provided a digital camera including an image taking unit for outputting image data by taking the image of an object, a memory medium capable of storing a plurality of print formats to be set in a predetermined print device, and first communication means capable of communicating with an image output apparatus for transferring the image data and the print formats stored in the memory medium to the image output apparatus; and an image output apparatus including second communication means capable of communicating with the digital camera, image process means for analyzing the image data and the print format thereof stored in the memory medium of the digital camera and received through the first and second communication means and applying predetermined image processing on the image data thereby generating print data, and print means for printing the print data generated by the image process means.

In a twelfth aspect in the present invention, there is provided a data processing method for use in an image processing system in which a digital camera provided with an image memory and an image output apparatus can communicate through a predetermined communication medium, wherein the method comprises a setting step of setting a desired print format for the image output apparatus, for the image data taken by the digital camera and stored in the image memory, and a writing step of writing the desired print format set by the setting step in the image memory.

In a thirteenth aspect in the present invention, the above mentioned setting step is adapted to set, as the desired print format for the image output apparatus, vertical/horizontal information of the taken image data, image output size information, image output number information and layout information.

In a fourteenth aspect in the present invention, there is provided a data processing method for use in an image processing system in which a digital camera provided with an image memory and an image output apparatus can communicate through a predetermined communication medium, wherein the method comprises an acquisition step of acquiring the image data and the desired print format stored in the image memory, an image processing step of analyzing the image data and the desired print format acquired in the acquisition step thereby generating print data with a layout, and a printing step of printing the print data, generated by the image processing step, on a recording medium.

In a fifteenth aspect in the present invention, there is provided a memory medium storing a computer readable program for controlling an image processing system in which a digital camera provided with an image memory and an image output apparatus can communicate through a predetermined communication medium, wherein the program comprises a setting step of setting a desired print format for the image output apparatus, for the image data taken by the digital camera and stored in the image memory, and a writing step of writing the desired print format set by the setting step in the image memory.

In a sixteenth aspect in the present invention, the above-mentioned setting step is adapted to set, as the desired print format for the image output apparatus, vertical/horizontal information of the taken image data, image output size information, image output number information and layout information.

In a seventeenth aspect in the present invention, there is provided a memory medium storing a computer readable program for controlling an image processing system in which a digital camera provided with an image memory and an image output apparatus can communicate through a predetermined communication medium, wherein the program comprises an acquisition step of acquiring the image data and the desired print format stored in the image memory, an image processing step of analyzing the image data and the desired print format acquired in the acquisition step thereby generating print data with a layout, and a printing step of printing the print data, generated by the image processing step, on a recording medium.

BRIEF DESCRIPTION OF THE DRAWINGS

FIG. 10 is a view showing the memory map of the memory medium storing various data processing programs readable by the image processing system of the present invention.

DESCRIPTION OF THE PREFERRED EMBODIMENTS

[First Embodiment]

Figure 1:
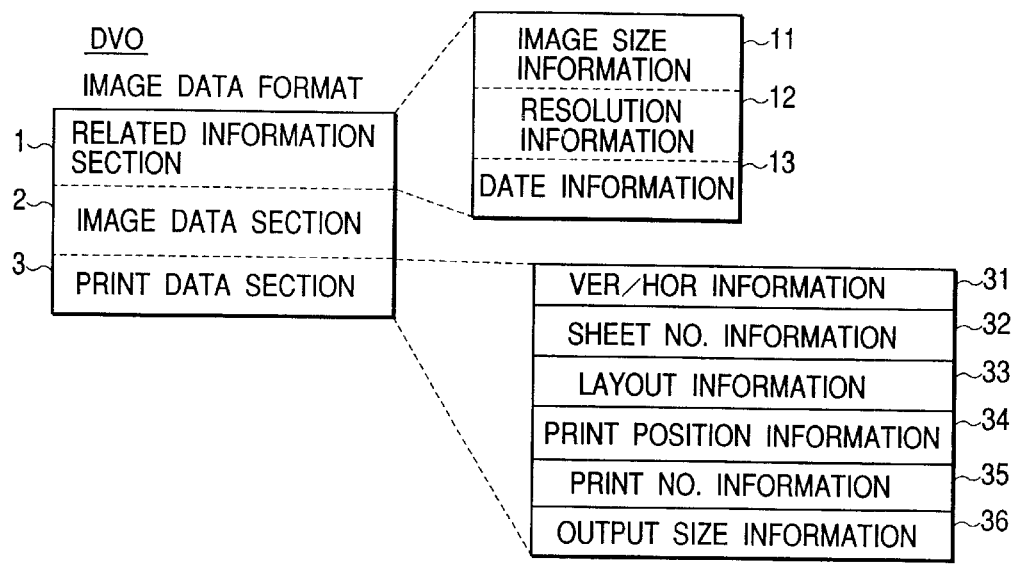
FIG. 1 is a view showing the format of an image memory apparatus constituting a first embodiment of the present invention.

FIG. 1 shows the format of an image memory apparatus constituting a first embodiment of the present invention, corresponding to the format in the memory medium storing corresponding image data. The image processing system in which the present embodiment is applicable includes a digital camera as an image input device, and a printer of various printing methods as an image output device, in which the image input device and the image output device can communicate through a predetermined communication medium.

Referring to FIG. 1, an image data format DVO is composed of a related information section 1, an image data section 2 compressed with a predetermined compression method, and a print data section 3 corresponding to print control data required for printing of the image data stored in the image data section 2.

The related information section 1 is composed for example of image size information 11, resolution information 12, date information 13, etc. Such related information will not be explained in more detail, as it is already used in the conventional general-purpose formats such as TIFF or JPEG.

In the print data section 3, vertical/horizontal information 31 indicates whether the camera is held in the vertical position or in the horizontal position in taking the image of the object. In the present embodiment, the camera may be held in the vertical position with the right side or the left side at the bottom. Therefore, the left, right or bottom side of the camera is detected by a mechanism utilizing a weight, and the information on the vertical/horizontal position of the camera is recorded at the image taking operation.

Sheet number information 32 is used in case plural images are printed on plural sheets, and indicates the ordinal number of the sheet on which the image is to be printed.

Layout information 33 indicates the layout of the image data (including the photographed image data) stored in the image data section 2, on a sheet. In the present embodiment, there is adopted a method of selecting one of plural layout templates including the one shown in FIG. 2, so that the number of the template is set in this information.

Figure 2:
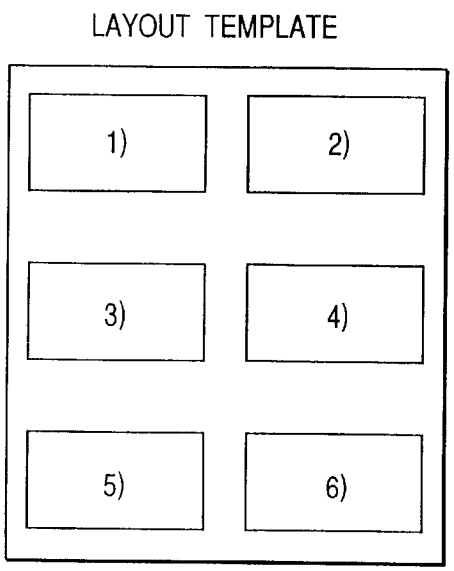
FIG. 2 is a view showing an example of the layout template for the image data shown in FIG. 1.

FIG. 2 shows a layout template for outputting data of six images, but there are provided plural templates for example for outputting one image or two images.

Print position information 34 indicates the position of printing in the layout prepared in advance. As an example, if a layout template as shown in FIG. 2 is selected, there is selected the print position of the image data in one of the positions 1) to 6). Print number information 34 indicates the number of sheets of the number set by the layout information 33.

Output size information 36 indicates the output size of the stored image data, represented by the horizontal length of the printed image.

In the following the configuration featuring the present embodiment will be explained with reference to FIG. 1.

The image memory apparatus constructed as explained above (in which a memory card of various types, including a flush memory, is incorporated or detachably mounted) is provided with a memory medium capable of storing a plurality of print formats to be set in the predetermined print device together with the image data to be inputted, so that the photographed image data and the print format required for printing such image data can be managed on a same memory medium, and the burden of print format setting at the printing operation can be alleviated.

Also the area for storing such print format is secured in each image data storing area (print data section 3 in FIG. 2) in the memory medium, so that the photographed image data and the print format required for printing such image data can be individually managed on the same memory medium, and the desired image data and print format can be processed at a high speed.

Furthermore, the print format includes the vertical/horizontal information 31 of the taken image data, the output size information 36, the image output number (print number information 35) and the layout information 33, so that the print format desired by the user can be designated in detail, while the resources of the image output device are effectively utilized.

[Second Embodiment]

Figure 3:
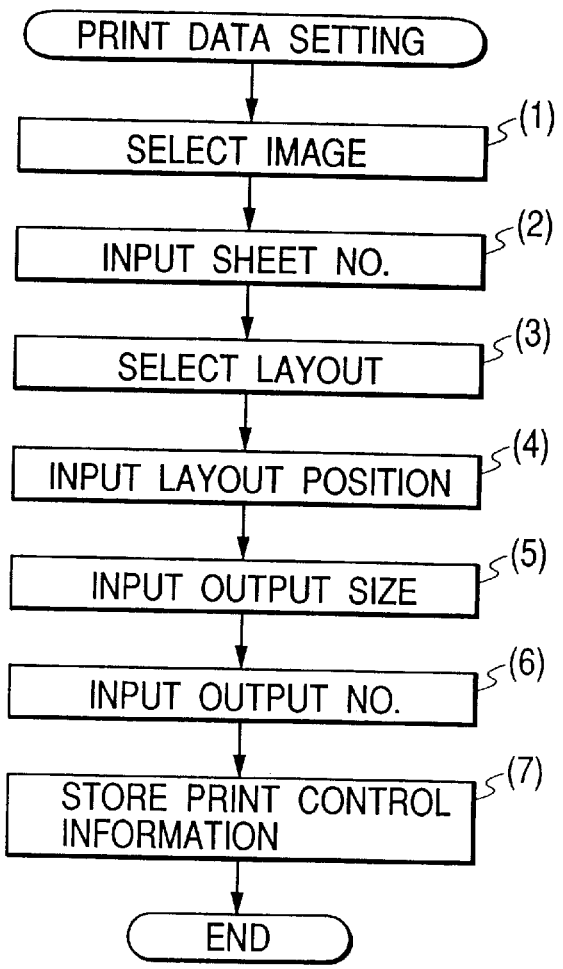
FIG. 3 is a flow chart showing a data processing procedure in a digital camera constituting a second embodiment of the present invention.

FIG. 3 is a flow chart showing a data processing procedure in a digital camera constituting a second embodiment of the present invention, wherein (1) to (7) indicate process steps. Various information can be set in the digital camera itself, in the accessory thereof or a personal computer, and there will be explained, in the following, the case of information setting in the digital camera.

At first, the data processing mode of the digital camera is set at a print data setting mode by an unrepresented operation unit, and the images on which the print data sections 3 shown in FIG. 1 are to be set are selected, under the confirmation of the image data taken and stored in the memory medium by the image display device of the digital camera (1). After the selection of the image data in the manner, the output sheet number is entered (2). Then the layout for the output sheet of such number is selected (3). The layout is selected by the user from the templates displayed on the image display unit of the digital camera.

After the determination of the layout, there is entered a layout position indicating the position where the currently selected image is to be positioned in the layout (4), and then the output size, indicating the size of output of such image, is entered (5). The output size is designated by the horizontal length of the size of the printed image, but the entire image may not be accommodated, depending on the designated size, in the designated position, for example in case a template as shown in FIG. 2 is designated and a position 1) is selected. In such case, the image overflowing from the frame 1) is not printed.

Then the number of output sheets is entered (6). In this manner the print control information for the printing operation are set, and the print control information set by the user are stored in the print data section 3 in the image format (7), whereupon the sequence is terminated.

The print data set as explained in the foregoing can be confirmed in a print data confirmation mode of the digital camera, and can naturally be reset if desired.

In the foregoing there has been explained the setting of the print data in the digital camera, but the print data can also be set in the personal computer as explained before.

In the following the configuration featuring the present embodiment will be explained with reference to a flow chart shown in FIG. 3.

In the above-described image processing system in which the digital camera provided with the image memory and the image output apparatus can communicate through the predetermined communication medium, or in a memory medium storing a computer readable program for controlling the image processing system in which the digital camera provided with the image memory and the image output apparatus can communicate through the predetermined communication medium, there are provided a setting step (steps (1)–(6) in FIG. 3) for setting the desired print format for the image output apparatus, to the image data taken with the digital camera and stored in the image memory, and a writing step (step (7) in FIG. 3) for writing the desired print format, set by the setting step, in the image memory, whereby the burden of the user in setting plural information as the print format can be alleviated and there can be prevented erroneous information setting by the user, so that defective printing of the image data in the unintended layout can be avoided in the printing operation of the image output apparatus.

Also as the setting step includes, as the desired print format for the image output apparatus, the vertical/horizontal information of the taken image data, the image output size information, the image output size information, the image output number information and the layout information, it is rendered possible to designate the desired print formation in detail while effectively utilizing the resources of the image output apparatus.

[Third Embodiment]

Figure 4:
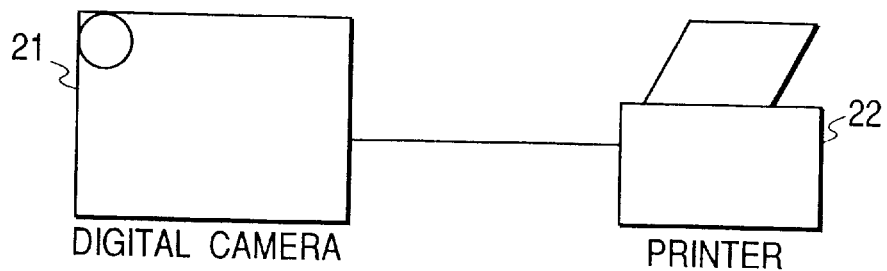
FIG. 4 is a block diagram showing the configuration of an image processing system constituting a third embodiment of the present invention.

FIG. 4 is a block diagram showing the configuration of an image processing system constituting a third embodiment of the present invention. The image processing system of the present embodiment includes a digital camera or the like as the image input device and a printer of various printing methods as the image output device, wherein the image input device and the image output device are rendered capable of communication through a predetermined communication medium.

Referring to FIG. 4, a digital camera 21 is provided with an incorporated or mounted memory medium, such as a flush memory, whereby the taken image data can be stored in a predetermined format (JPEG). A printer 22 is rendered capable of communication with the digital camera 21 or an unrepresented personal computer through a predetermined communication medium. The digital camera 21 has a photographing mode and a print data setting mode, either of which is rendered effective by a mode switching operation in the operation unit.

Figure 5:
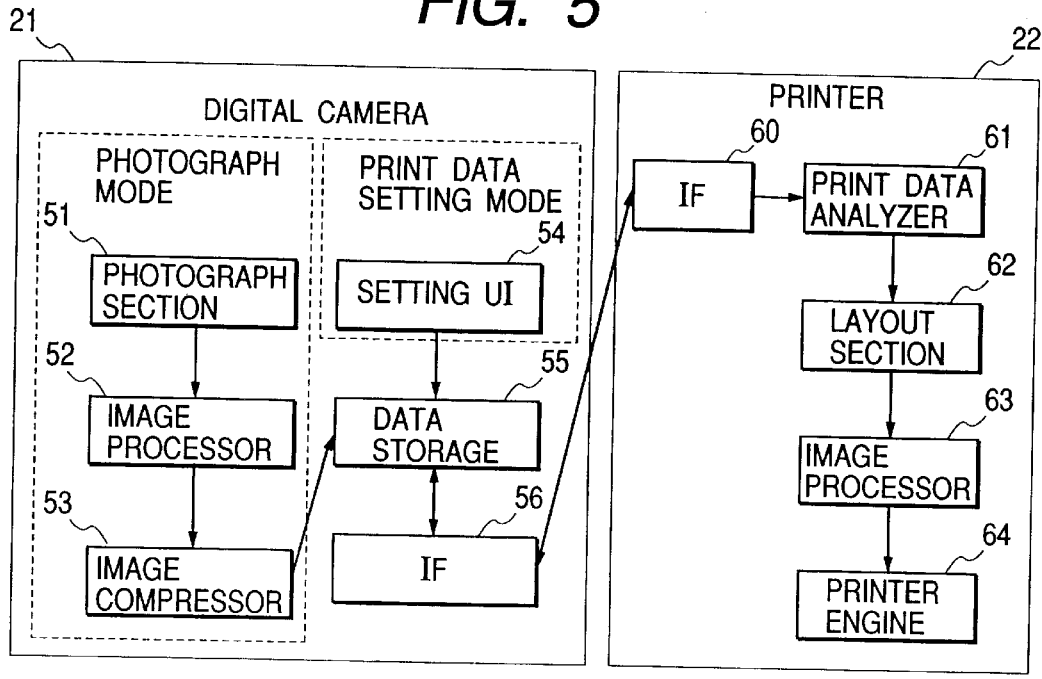
FIG. 5 is a block diagram showing the details of the image processing system shown in FIG. 4.

FIG. 5 is a block diagram showing the detailed configuration of the image processing system shown in FIG. 4. In the present embodiment, the image taking operation in the digital camera is executed in the "photographing mode". Also the present embodiment corresponds to a system for printing by connecting the digital camera 21 and the printer 22 without passing through the personal computer.

In a photographing section 51, the image of the object formed by an unrepresented lens system is focused on an image sensor (CCD), and an analog image signal (CCD signal) is subjected to A/D conversion to generate image data.

In the digital camera 21, an image processor 52 executes image processing such as color conversion, color adjustment, gamma correction, etc. on the image data obtained from the photographing section 51 and effects conversion to image data to be stored.

An image compressor section 53 executes conversion of the image data, subjected to color conversion, etc. in the preceding image processor 52, into the image data of JPEG format which are supplied to a data storage section 55 and stored on the memory medium. A UI setting section 54 is rendered operable to enable entry of the print data to be explained later, when the digital camera is switched to the "print data setting mode". The set data are transmitted as a print data file to the data storage unit 55 and stored therein.

An interface section 56 executes image data communication with the printer 22 by a predetermined protocol.

In the printer 22, there are provided an interface section 60 for image data communication with the digital camera 21 by a predetermined protocol, and a print data analyzer section 61 for analyzing various data in the print data file received from the digital camera 21 through the interface 60.

A layout section 62 executes a layout process for the received image data on an unrepresented memory (expandable memory), according to the result of analysis of the print data analyzer 61. An image processor section 63 executes various image processings including color conversion (also including inversion, rotation, special effect, etc.) on the received image data according to the result of analysis of the print data analyzer 61, thereby generating print data which can be printed by a printer engine 64. The printer engine 64 can be of any type for printing a color image or a monochromatic image as long as it can print an image on a recording medium.

Figure 6:
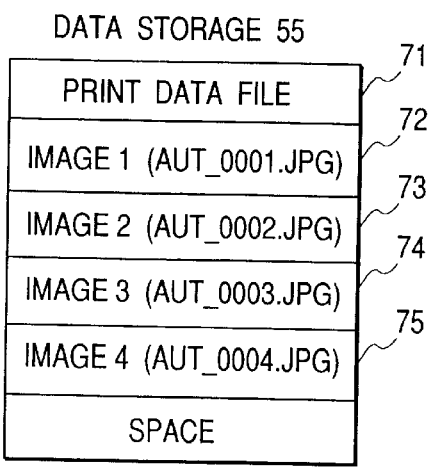
FIG. 6 is a view showing an example of the memory map of the data storage unit shown in FIG. 5.

FIG. 6 shows an example of the memory map of the data storage section 55 shown in FIG. 5, corresponding to another embodiment of the image memory apparatus.

Referring to FIG. 6, a print data file (including sheet number, file name, vertical/horizontal information, layout template number, print position, number of prints and output size) 71 contains the print data (print control data) set for example by the UI setting section 54. The print data file 71 can be prepared by the digital camera or by the personal computer, and is used for the image printout.

72–75 indicate image data outputted from the image compressor section 53, including a space area depending on the memory capacity of the data storage unit 55. The image data 72–75 are stored in the JPEG format.

As the data storage section 55 functioning as the image memory apparatus stores the above-mentioned print format in an area (print data file 71 in FIG. 6) different from each image data storage area in the memory medium, the photographed image data and the print format required in the printing of such image data can be managed in a unified manner on the same memory medium, and for example the list of print formats of all the image data can be prepared at a high speed.

Also as explained in the foregoing, the digital camera 21 is provided with the photographing section 51 for outputting the image data by taking the image of the object, the memory medium capable of storing a plurality of print format to be set on the predetermined print apparatus together with the image data outputted from the photographing section 51, and the communication means (interface 56) for communicating with the external output apparatus for transferring thereto the image data and the print format stored in the memory medium, whereby it is rendered possible to transfer the taken image data and the desired print format to the desired external output apparatus at any time, while managing the image data and the print format on the same memory medium.

Also as the area for storing the print format (similar to the print data section 3 shown in FIG. 1) is secured in the image data storage area in the above-mentioned memory medium, it is rendered possible to individually manage the photographed image data and the print format required for printing such image data on the same memory medium and to process the desired image data and print format therefor at a high speed in the image output apparatus.

Furthermore, as the print data file 71 of the data storage section 55, storing the above-mentioned print format, is stored in an area different from the image data memory area in the memory medium, it is rendered possible to collectively manage the photographed image data and the print formats required for printing such image data in the same memory medium and to prepare, for example, the list of print formats of all the image data at a high speed in the image output apparatus.

Furthermore, as there are provided the display means (unrepresented LCD display) for displaying the photographed image data, the first designation means (unrepresented member (switch) provided in the UI setting section 54) for designating the confirmation mode for confirming the print format stored in the memory medium, and the control means for causing the display means to display the stored print format (CPU in the digital camera 21 effecting the display based on a control program stored in a ROM) when the confirmation mode is designated by the first designation means, it is rendered possible to confirm the print format set or designated for the photographed image data managed in the same memory medium, and to flexibly accommodate the correction or the like of the print format after setting or designation.

Furthermore, as there are provided the second designation means (unrepresented member (switch) in the UI setting section 54) for setting the print format for each image data stored in the memory medium, and the format setting means (unrepresented member (switch) in the UI setting section 54) for setting, in the memory medium, the desired print format entered for each image data in case the format mode is designated by the second designation means, the print format is set on the memory medium in a mode independent from the photographing of the object, so that the user can set the desired print format at any time for each photographed image data.

Furthermore, as there is provided detection means (unrepresented sensor mechanism which can be electrical or mechanical) for detecting the vertical or horizontal position of the camera body at the photographing operation and the CPU of the digital camera 21 automatically sets the vertical/horizontal information of the photographed image data in the print format in the memory medium, based on the position detected by such sensor mechanism, it is rendered possible to alleviate the burden of the user in setting the plural information settable as the print format and to avoid erroneous information setting by the user, thereby preventing the defective printing of the image data in the unintended layout at the printing operation in the image output apparatus.

Furthermore, as the image processing system of the above-described configuration is provided with the digital camera 21 including the photographing section 51 for outputting the image data by taking the image of the object, the memory medium capable of storing a plurality of print format to be set on the predetermined print apparatus together with the image data outputted from the photographing section 51, and the first communication means (interface 56) capable of communicating with the image output apparatus for transferring thereto the image data and the print formats stored in the memory medium; and the image output apparatus (printer 22) including the image process means (print data analyzer section 61, layout section 62 and image processor section 63) for analyzing the image data and the print format therefor received through the first and second communication means and stored in the memory medium of the digital camera 21 and applying the predetermined image processing to each image data thereby generating the print data, and print means (printer engine 64) for printing the print data generated by the image process means, it is rendered possible, while simultaneously managing the photographed image data and the print format designated or set on the digital camera on the same memory medium provided therein, to alleviate the burden of the user in setting or designating the print format for each image data at the printing of such image data in the image output apparatus, and to avoid errors in the setting or designation of the print format for each image data, thereby enabling to obtain the processed print in the print format desired by the user, at a high speed and without errors.

Figures 7, 8:
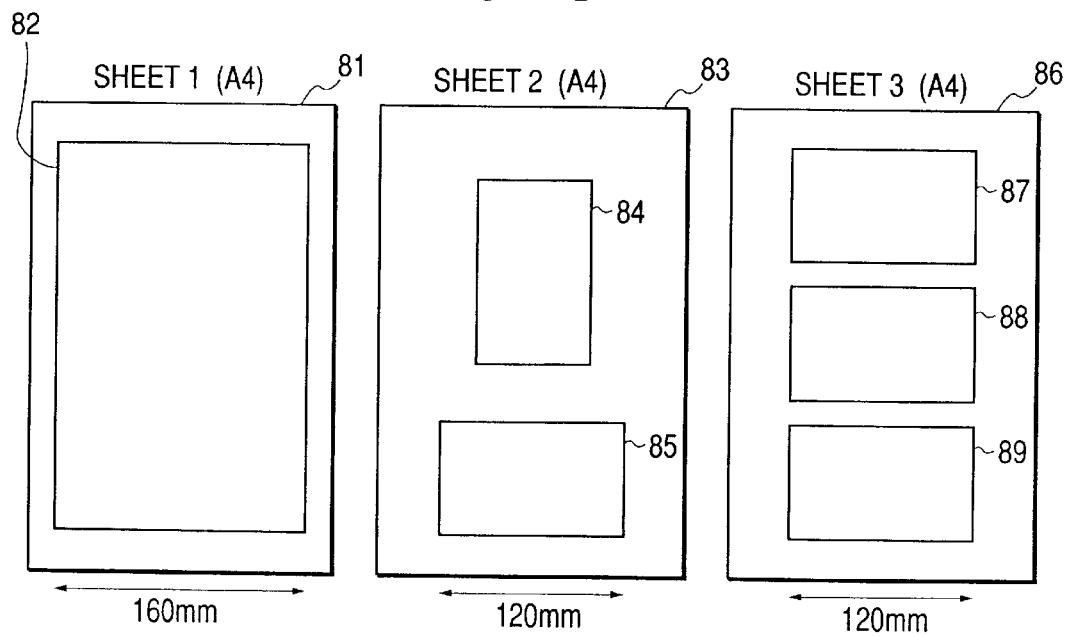
FIG. 7 is a view showing an example of the data of the print data file shown in FIG. 6.
FIG. 8 is a view showing an example of layout output of the image data designated by the print data file shown in FIG. 7.

FIG. 7 is a view showing an example of data of the print data file 71 shown in FIG. 6.

FIG. 8 shows examples of output layout of the image data, designated by the print data file 71 shown in FIG. 7.

In these drawings, a first image data output 81 shows the output state of an image 82 in the vertical state with an output size of 160 mm, corresponding to the image data 72 shown in FIG. 6 and based on the print data corresponding to the image data 72, through the print data analyzer 61, layout section 62, image processor 63 and printer engine 64.

A second image data output 83 shows the output state of images 84, 85 with an output size of 120 mm and respectively in the vertical and horizontal states, corresponding to the image data 72, 73 shown in FIG. 6 and based on the print data respectively corresponding to the image data 72, 73, through the print data analyzer 61, layout section 62, image processor 63 and printer engine 64.

A third image data output 86 shows the output state of images 87, 88, 89 with an output size of 120 mm and in the horizontal state, corresponding to the image data 72, 73, 74 shown in FIG. 6 and based on the print data respectively corresponding to the image data 72, 73, 74 through the print data analyzer 61, layout section 62, image processor 63 and printer engine 64.

In the following there will be explained the data processing procedure in case the digital camera 21 and the printer 22 are connected through the interfaces 56, 60.

The data flow takes place in the following manner in case of such direct connection.

When the digital camera 21 is connected with the printer 22, the print data file 71 is transmitted from the data storage section 55 to the printer 22 through the interfaces 56, 60. The print data file 71 is supplied to the print data analyzer section 61 of the printer 22 and the content of the file is analyzed therein. According to the content of the file, the required image data are downloaded from the digital camera 21, and, if the image data are compressed, the image data are decompressed in the image compressor section 53 prior to the downloading.

The image data supplied from the digital camera 21 are subjected to layout construction in the layout section 62, then converted into the print data in the image processor section 63 and supplied to the printer engine 64 for printing.

In the present embodiment, the print size is designated by the length in the horizontal direction, but such method is not restrictive and the size may also be designated by the output resolution or output magnification.

In the foregoing there has briefly been explained how the print data file 71 is utilized when the digital camera 21 and the printer 22 are connected, but, if the data storage section 55 shown in FIG. 5 is detachable from the digital camera 21, the printout of the desired size and layout can be easily obtained by setting the print data file 71 at the digital laboratory and handing the data storage section 55 thereto.

Figure 9:
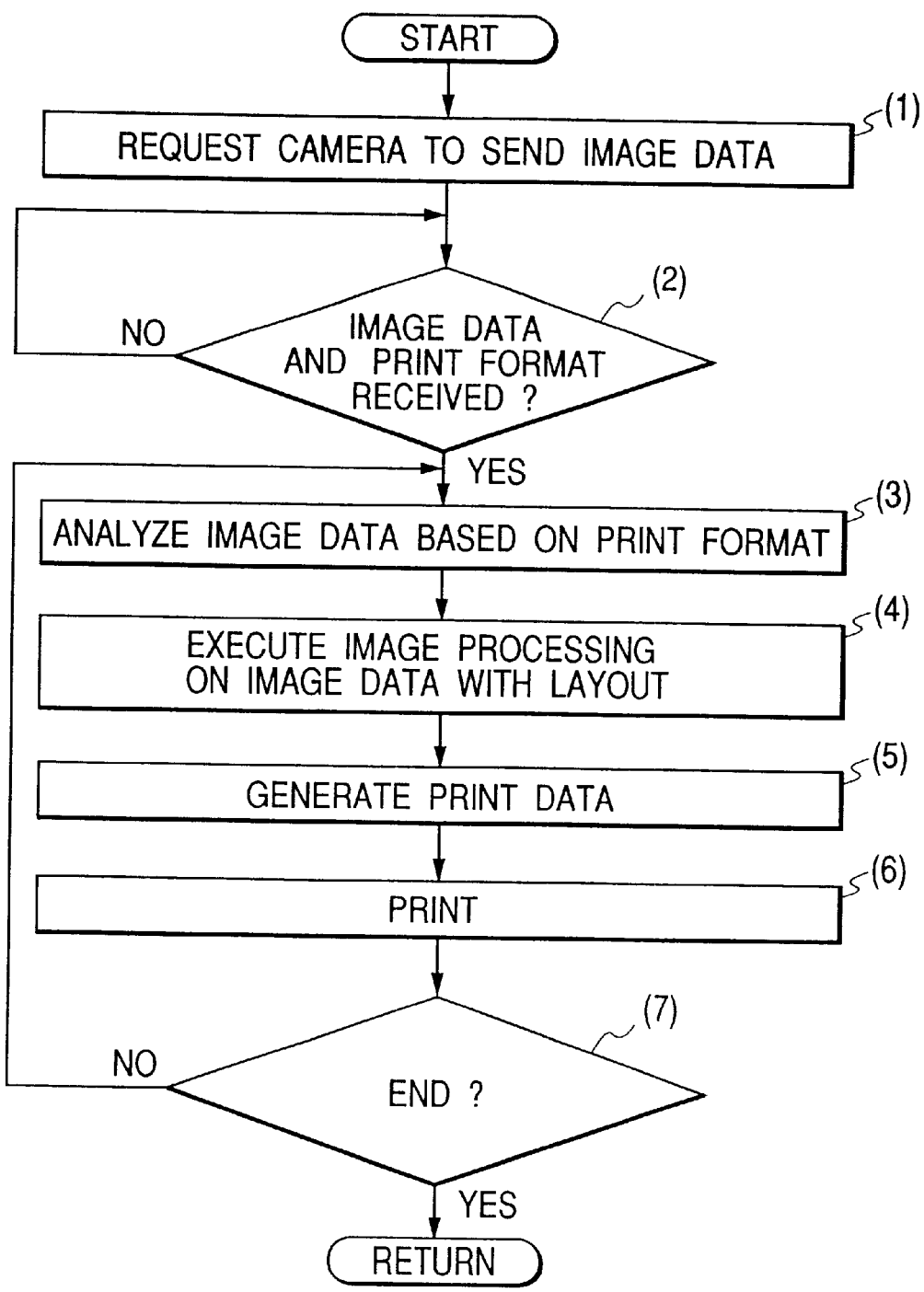
FIG. 9 is a flow chart showing a data processing procedure in an image processing system of the present invention.

FIG. 9 is a flow chart showing an example of the data processing procedure in the image processing system of the present invention, wherein (1) to (7) indicate process steps.

At first the printer 22 issues an image data request to the digital camera 21 through the interface 60 (1). Then it awaits the reception of the stored image data and print format from the data storage section 55 through the interface 56 of the digital camera 21 (2), and, upon reception, the print analyzer section 61 analyzes the received image data according to the print format (3). Then the layout section 62 and the image processor 63 execute the image processing, including the layout construction (4).

Then the image processor 63 generates final bit map image data (print data) printable by the printer engine 64 (5), and the printer engine 64 executes the printing operation (6).

Then there is discriminated whether the printing process is completed, according to the print format, and, if completed, the sequence is terminated, but, if not completed, the sequence returns to the step (3) to continue the remaining printing operation.

In the image processing system of the above-described configuration in which the digital camera 21, provided with the image memory (image storage section 55), and the image output apparatus (printer 22) can communicate through the predetermined communication medium, or in the memory medium storing the computer readable program for controlling the image processing system in which the digital camera 21, provided with the image memory, and the image output apparatus can communicate through the predetermined communication medium, there are provided the acquisition step (steps (1), (2) in FIG. 9) for acquiring the image data and the desired print format stored in the image memory, the image processing step (steps (3)–(5) in FIG. 9) for analyzing the image data and the desired print format, acquired in the acquisition step, to generate the print data including the layout, and the printing step (step (6) in FIG. 9) for printing the print data, generated in the image processing step, on the recording medium, whereby it is rendered possible to securely acquire the print format, corresponding to each image data stored in the memory medium of the digital camera, by the communication therewith, and to obtain the print including the layout processed according to the print format set by the user on the digital camera, at a high speed and without errors.

In the following there will be explained, with reference to a memory map shown in FIG. 10, the configuration of the data processing program, readable by the image processing system of the present invention.

FIG. 10 shows a memory map of the memory medium storing various data processing programs readable by the image processing system of the present invention.

Though not particularly illustrated, the memory medium may also store information for managing the programs stored therein, such as version information, producer of the program etc., and information dependent on the operating system etc. of the program reading equipment, such as icons for identifying the programs.

Furthermore, the data belonging to these programs are also managed by the directory. There may also be stored programs for installing various programs into the computer and thawing programs in case the programs to be installed are compressed.

In the present embodiment, the functions shown in FIG. 3 or 9 may be executed by the host computer by an externally installed program. In such case, the present invention is likewise applicable also in case the information, including the program, is supplied to the output apparatus from a memory medium such as CD-ROM, flush memory or floppy disk or from an external memory medium through a network.

Also the object of the present invention can naturally be attained in a case where a memory medium storing the program codes of a software realizing the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the novel functions of the present invention, and the memory medium storing the program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, a ROM or an EEPROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

The foregoing embodiments allow to provide the digital camera with the print format confirming mode and the print format setting mode, to determine the images to be printed while confirming the images on the liquid crystal display of the digital camera, also to set the output size of the image and the number of outputs thereof and to designate the layout thereof, and to store such information in the print format storage area of the same memory medium storing the image data.

As explained in the foregoing, according to the first aspect in the present invention, as there is provided a memory medium capable of storing a plurality of print formats to be set in a predetermined printing device together with input image data, it is rendered possible to manage the photographed image data and the print format required for printing such image data on the same memory medium and to alleviate the burden of print format setting at the printing operation.

According to the second aspect in the present invention, as the area for storing the print format is secured within each image data storage area in the memory medium, it is rendered possible to individually manage the photographed image data and the print format required for printing such image data on the same memory medium and to achieve high-speed processing of the desired image data and print format.

According to the third aspect in the present invention, as the area for storing the print format is secured outside each image data storage area in the memory medium, it is rendered possible to collectively manage the photographed image data and the print formats required for printing such image data on the same memory medium and to achieve high-speed preparation, for example, of the list of print formats of all the image data.

According to the fourth aspect in the present invention, as the print format includes vertical/horizontal information of the photographed image data, image output size information, image output number information and layout information, it is rendered possible to designate the print format desired by the user in detail, while effectively utilizing the resources of the image output apparatus.

According to the fifth aspect in the present invention, as there are provided an image taking unit for outputting image data by taking the image of an object, a memory medium capable of storing a plurality of print formats to be set in a predetermined print device together with the image data outputted from the image taking unit, and communication means capable of communicating with the external output apparatus thereby transferring the image data and the print formats stored in the memory medium to the external output apparatus, it is rendered possible to transfer the photographed image data and the desired print format to the external output apparatus at any time, while managing the image data and the print format in the same memory medium.

According to the sixth aspect in the present invention, as the area storing the print formats is secured in each image data storage area in the memory medium, it is rendered possible to individually manage the photographed image data and the print format required for printing such image data within the same memory medium and to achieve high-speed processing of the desired image data and print format in the image output apparatus.

According to the seventh aspect in the present invention, as the area for storing the print formats is secured in an area different from the image data storage area in the memory medium, it is rendered possible to collectively manage the photographed image data and the print formats required for printing such image data in the same memory medium and to achieve high-speed preparation, for example, of the print format list of all the image data in the image output apparatus.

According to the eighth aspect in the present invention, as there are provided display means for displaying the photographed taken image data, first designation means for designating a confirmation mode for confirming the print format stored in the memory medium, and control means for causing the display means to display the stored print formats when the confirmation mode is designated by the first designation means, it is rendered possible to confirm the print format set or designated for the image data managed in the same memory medium and to flexibly respond to the correction or the like of the print format after setting or designation thereof.

According to the ninth aspect in the present invention, as there are provided second designation means for designating a format mode for setting the print format for each image data stored in the memory medium, and format setting means for setting, in the memory medium, the desired print format entered for each image data when the format mode is designated by the second designation means, it is rendered possible to set, in the memory medium, the print format in the format independent from the photographing operation of the object, thereby setting the desired print format to each photographed image data, at any time desired by the user.

According to the tenth aspect in the present invention, as there is provided detection means for detecting whether the camera unit is in the vertical or horizontal state in the photographing state, and the format setting means is adapted to automatically set the vertical/horizontal information of the photographed image data in the print format in the memory medium, based on the positional state detected by the detection means, it is rendered possible to alleviate the burden of the user in setting plural information as the print format and to avoid erroneous information setting by the user, thereby avoiding defective printing with an undesired layout in the printing operation of the image output apparatus.

According to the eleventh aspect in the present invention, as there are provided a digital camera including an image taking unit for outputting image data by taking the image of an object, a memory medium capable of storing a plurality of print formats to be set in the predetermined print device, and first communication means capable of communicating with the image output apparatus for transferring the image data and the print formats stored in the memory medium to the image output apparatus; and an image output apparatus including second communication means capable of communicating with the digital camera, image process means for analyzing the image data and the print format therefor stored in the memory medium of the digital camera and received through the first and second communication means and applying predetermined image processing on the image data thereby generating print data, and print means for printing the print data generated by the image process means, it is rendered possible to alleviate the burden of setting or designating the print format for each photographed image data in the printing operation in the image output apparatus, while simultaneously managing each photographed image data and the print format set or designated for the image data in the digital camera by the same memory medium provided therein, and also to avoid errors in the setting or designation of the print format for each image data, thereby obtaining printout processed according to the print format desired by the user, at a high speed.

According to the twelfth and fifteenth aspects in the present invention, there is provided a data processing method for use in an image processing system in which a digital camera provided with an image memory and an image output apparatus can communicate through a predetermined communication medium, or a memory medium storing a computer readable program for controlling an image processing system in which a digital camera provided with an image memory and an image output apparatus can communicate through a predetermined communication medium, there are provided a setting step of setting a desired print format for the image output apparatus, for the image data taken by the digital camera and stored in the image memory, and a writing step of writing the desired print format set by the setting step in the image memory, so that it is rendered possible to alleviate the burden of the user in setting plural information as the print format and to avoid erroneous information setting by the user, thereby avoiding defective printing with an undesired layout in the printing operation of the image output apparatus.

In the thirteenth and sixteenth aspects in the present invention, as the above-mentioned setting step is adapted to set, as the desired print format for the image output apparatus, vertical/horizontal information of the photographed image data, image output size information, image output number information and layout information, the user can designate the desired print format in detail, while effectively utilizing the resources of the image output apparatus.

According to the fourteenth and seventeenth aspects in the present invention, there is provided a data processing method for use in an image processing system in which a digital camera provided with an image memory and an image output apparatus can communicate through a predetermined communication medium or a memory medium storing a computer readable program for controlling an image output system in which a digital camera provided with an image memory and an image output apparatus can communicate through a predetermined communication medium, as there are provided an acquisition step of acquiring the image data and the desired print format stored in the image memory, an image processing step of analyzing the image data and the desired print format acquired in the acquisition step thereby generating print data with a layout, and a printing step of printing the print data, generated by the image processing step, on a recording medium, it is rendered possible to securely acquire, through the communication with the digital camera, the print format for each image data stored in the memory medium of the digital camera, and to obtain the print with the layout processed according to the print format set by the user on the digital camera, at a high speed and without errors.

Consequently, the image data and the corresponding print format, which have been managed separately and independently, can now be managed in a unified manner, whereby it is rendered possible to alleviate the burden of setting of the print format corresponding to the photographed and stored image data, and to flexibly respond to the alteration or correction of the content of thus set print format, thereby securely and easily obtaining the intended print result from the image output apparatus.

What is claimed is:

1. A digital camera comprising:
   an image taking unit for outputting digital image data by taking an image of an object;
   an access unit for accessing a memory storing print control data indicative of a print format for printing the digital image data on a printing medium, which control data is to be set in a predetermined printer, together with the digital image data outputted from said image taking unit;
   a communication unit for communicating with an external printer, thereby to transfer the digital image data and the print control data stored in said memory to the external printer for printing the digital image data on the printing medium in accordance with the print control data; and a setting unit for setting the print control data including information to designate the image to be printed, wherein said setting unit automatically sets the print control data as vertical and horizontal information of each image to be printed, on the basis of vertical and horizontal information obtained when taking the image.

2. A digital camera according to claim 1, wherein an area for storing the print control data is secured in each image data memory area in said memory.

3. A digital camera according to claim 1, wherein an area for storing the print control data is secured in an area different from each image data memory area in said memory.

4. The digital camera of claim 1, wherein the print format includes information for laying out a plurality of images on a printing sheet.

5. A digital camera comprising:

display means for displaying an image taken by said digital camera;

first designation means for designating a confirmation mode for confirming a print format stored in a memory medium, the print format being indicative of a format for printing the image on a printing medium;

control means for causing said display means to display the stored print format, if the confirmation mode is designated by said first designation means; and a setting unit for setting the print format including information to designate the image to be printed, wherein said setting unit automatically sets the print format as vertical and horizontal information of each image to be printed, on the basis of vertical and horizontal information obtained when taking the image.

6. A digital camera according to claim 5, further comprising:

second designation means for designating a format mode for setting a print format for each image stored in the memory medium, wherein said setting unit sets, in the memory medium, a desired print format entered for each image, if the format mode is designated by said second designation means.

7. A digital camera according to claim 6, further comprising detection means for detecting whether a camera body is in a vertical position or a horizontal position in the image taking state, wherein said setting means is adapted to automatically set vertical/horizontal information of the taken image in the print format in the memory, based on the positional information detected by said detection means.

8. The digital camera of claim 5, wherein the print format includes information for laying out a plurality of images on a printing sheet.

9. An image processing system comprising:

a digital camera comprising:

an image taking unit for outputting digital image data by taking an image of an object;

an access unit for accessing a memory storing print control data to be set in a predetermined print apparatus, the print control data being indicative of a format for printing the digital image data on a print medium, together with the digital image data outputted by said image taking unit;

a first communication unit for communicating with an external output apparatus thereby transferring the digital image data and the print formats stored in said memory medium to the external output apparatus; and a setting unit for setting the print control data including information to designate the image to be printed; and an image output apparatus comprising:

a second communication unit for communicating with said digital camera;

an image processor for analyzing the digital image data and the print format therefor stored in said memory and received through said first and second communication units, and applying a predetermined image process to the image data thereby to generate print data; and a print unit for printing on the print medium the print data generated by said image processor, wherein said setting unit automatically sets the print control data as vertical and horizontal information of each image to be printed, on the basis of vertical and horizontal information obtained when taking the image.

10. The system of claim 9, wherein the print format includes information for laying out a plurality of images on a printing sheet.

11. A data processing method for an image processing system in which a digital camera takes a digital image for storage in a digital memory as digital image data and an image output apparatus communicates through a predetermined communication medium, said method comprising the steps of:

setting a desired print format, the print format being indicative of a format for printing the stored digital image data on a print medium, for the image output apparatus, for the digital image taken by the digital camera and stored as digital image data in the image memory; and writing the desired print format set in said setting step into the image memory, wherein said setting step includes automatically setting the print format as vertical and horizontal information of each image to be printed, on the basis of vertical and horizontal information obtained when taking the image.

12. A data processing method according to claim 11, wherein said setting step includes setting, as the desired print format for the image output apparatus, vertical/horizontal information of the stored digital image data, image output size information, image output number information and layout information.

13. The method of claim 11, wherein the print format includes information for laying out a plurality of images on a printing sheet.

14. A data proceeding method for an image processing system in which a digital camera takes a digital image for storage in a digital memory as digital image data and an image output apparatus communicates through a predetermined communication medium, said method comprising the steps of:

acquiring the digital image data stored in the image memory and a desired print format, the print format being indicative of a format for printing the stored digital image data on a print medium and including information to designate the image to be printed;

analyzing the digital image data and the desired print format acquired in said acquiring step, to generate print data including layout information for laying out the print data on the print medium; and printing the print data, generated in said analyzing step, on the print medium according to the layout information, wherein the print format is set automatically as vertical and horizontal information of each image to be printed, on the basis of vertical and horizontal information obtained when taking the image.

15. The method of claim 14, wherein the print format includes information for laying out a plurality of images on a printing sheet.

16. A memory medium storing a computer readable program for controlling an image processing system in which a digital camera takes a digital image for storage in a digital memory as digital image data, and an image output apparatus communicates through a predetermined communication medium, said program comprising the steps of:

setting a desired print format, the print format being indicative of a format for printing the stored digital image data on a print medium and including information to designate the image to be printed, for the image output apparatus, for the digital image data taken by the digital camera and stored as digital image data in the image memory; and writing the desired print format set in said setting step into the image memory, wherein said setting step includes automatically setting the print format as vertical and horizontal information of each image to be printed, on the basis of vertical and horizontal information obtained when taking the image.

17. A memory medium according to claim 16, wherein said setting step includes setting, as the desired print format for the image output apparatus, vertical/horizontal information of the stored digital image data, image output size information, image output number information and layout information.

18. The memory medium of claim 16, wherein the print format includes information for laying out a plurality of images on a printing sheet.

19. A memory medium storing a computer readable program for controlling an image processing system in which a digital camera takes a digital image for storage in a digital memory as digital image data, and an image output apparatus communicates through a predetermined communication medium, said program comprising the steps of:

acquiring the digital image data stored in the image memory and desired print format, including information to designate the image to be printed;

analyzing the digital image data and the desired print format acquired in said acquiring step, to generate print data including layout information for laying out the print data on the print medium; and printing the print data, generated in said analyzing step, on the print medium according to the layout information, wherein the print format is automatically set as vertical and horizontal information of each image to be printed, on the basis of vertical and horizontal information obtained when taking the image.

20. The memory medium of claim 19, wherein the print format includes information for laying out a plurality of images on a printing sheet.

21. An image processing system comprising:

a digital camera, including:
a photographing unit for photographing an image;
a print data setting unit for setting print control data, including layout information for laying out and printing the photographed image on a print medium and including information to designate the image to be printed;

an accessing unit for accessing a memory storing the photographed image and a print data file of the print control data, including the layout information; and an output device for outputting the photographed image and the print data file of print control data, including the layout information; and a printer, including:
an input device for inputting the photographed image and the print data file of the print control data, including the layout information, output by said output device of said digital camera, and outputting same;

a print data analyzer for analyzing the print data file output by said input device;

a layout unit for laying out the photographed image in accordance with the layout information included in the print data file as analyzed by said print data analyzer;

an image processor for processing the laid-out photographed image; and a printer engine for printing out on the printing medium the laid-out photographed image processed by said image processor, wherein the print format is automatically set as vertical and horizontal information of each image to be printed, on the basis of vertical and horizontal information obtained when photographing the image.

22. The image processing system according to claim 21, wherein the print control data in the print data file further includes vertical/horizontal information relating to the vertical/horizontal position of said digital camera at the time of photographing the image.

23. The image processing system according to claim 22, wherein the print control data in the print data file further includes sheet number information.

24. The image processing system according to claim 23, wherein the print control data in the print data file further includes print position information.

25. The image processing system according to claim 24, wherein the print control data in the print data file further includes print number information.

26. The image processing system according to claim 25, wherein the print control data in the print data file further includes output size information.

27. The image processing according to claim 22, wherein the vertical/horizontal information is automatically detected by a vertical/horizontal position detector in said digital camera.

28. The image processing according to claim 21, wherein said digital camera further includes:

a photograph image processor for processing the photographed image from said photographing unit; and a compressor for compressing the processed photographed image from said photograph image processor, with the compressed processed photographed image being stored in said storage unit.

29. The system of claim 21, wherein the print format includes information for laying out a plurality of images on a printing sheet.

* * * * *